United States Patent [19]

Martin et al.

[11] Patent Number: 5,213,238

[45] Date of Patent: May 25, 1993

[54] MULTI-FUNCTIONAL, ENVIRONMENTALLY-ORIENTED, TAMPER-EVIDENT CONTAINER CLOSURE

[75] Inventors: Clyde J. Martin, Cincinnati; Gail F. Duncan, Dayton, both of Ohio

[73] Assignee: Tri-Made Products, Inc., Dayton, Ohio

[21] Appl. No.: 818,115

[22] Filed: Jan. 8, 1992

[51] Int. Cl.⁵ .............................................. B67D 3/00
[52] U.S. Cl. ................................... 222/480; 222/541; 222/548
[58] Field of Search ............... 222/143, 480, 482, 541, 222/548; 220/253; 206/508

[56] References Cited

U.S. PATENT DOCUMENTS

| | | |
|---|---|---|
| 1,586,781 | 6/1926 | Case et al. . |
| 1,685,147 | 9/1928 | Case . |
| 2,029,219 | 1/1936 | Bourland . |
| 2,655,288 | 10/1953 | Caretto . |
| 2,731,013 | 1/1956 | Holmes . |
| 2,833,452 | 5/1958 | Drummond et al. ............... 222/480 |
| 2,954,148 | 9/1960 | Corrinet et al. .................... 222/548 |
| 3,018,931 | 1/1962 | Westgate . |
| 3,042,273 | 7/1962 | Bauer et al. ......................... 222/548 |
| 3,045,871 | 7/1962 | Henrickson . |
| 3,101,877 | 8/1963 | Driscoll ............................... 222/548 |
| 3,180,537 | 4/1965 | Collins . |
| 3,261,516 | 7/1966 | Allen . |
| 3,317,087 | 5/1967 | Landis . |
| 3,369,687 | 2/1968 | Walls . |
| 3,463,364 | 8/1969 | Rehag . |
| 3,486,665 | 12/1969 | La Croce . |
| 3,705,659 | 12/1972 | Mackie . |
| 3,826,400 | 7/1974 | Hougen et al. . |
| 3,874,580 | 4/1975 | Weatherhead, III . |
| 4,126,244 | 11/1978 | Elser . |
| 4,128,186 | 12/1978 | Gane . |
| 4,141,462 | 2/1979 | Rucci . |
| 4,155,480 | 5/1979 | Debenham et al. . |
| 4,196,823 | 4/1980 | Madden et al. . |
| 4,308,979 | 1/1982 | Otterson . |
| 4,489,864 | 12/1984 | Davis . |
| 4,541,541 | 9/1985 | Hickman et al. . |
| 4,567,995 | 2/1986 | Kreiseder et al. . |
| 4,598,837 | 7/1986 | Kreiseder et al. . |
| 4,606,893 | 8/1986 | Sangster . |
| 4,611,725 | 9/1986 | Kacalieff . |
| 4,613,063 | 9/1986 | Wright . |
| 4,699,299 | 10/1987 | Gach . |
| 4,717,037 | 1/1988 | van der Meulen . |
| 4,752,016 | 6/1988 | Eads . |
| 4,792,054 | 12/1988 | Weidman . |
| 4,832,235 | 5/1989 | Palmer .............................. 222/548 |
| 4,846,374 | 7/1989 | Gabrys . |
| 4,869,389 | 9/1989 | Cerrone, Jr. . |
| 4,930,654 | 6/1990 | Thibeault et al. . |
| 4,938,379 | 7/1990 | Kellner . |
| 4,969,572 | 11/1990 | vanKerhoven . |
| 5,048,730 | 9/1991 | Forsyth et al. . |
| 5,054,633 | 10/1991 | Reijenga . |

*Primary Examiner*—Andres Kashnikow
*Assistant Examiner*—Philippe Derakshani
*Attorney, Agent, or Firm*—Killworth, Gottman, Hagan & Schaeff

[57] ABSTRACT

A multi-functional, environmentally-oriented one-piece container closure panel has a peripheral rib adapted to removably engage the lip of a container end. The closure panel is slidably rotatable on the lip such that an opening in the closure panel may be variably positioned in alignment with a push-in opening in the container end to control the dispensing of container contents. When removed, the one-piece container closure may be disposed of separately, allowing recycling of reusable container materials or disposal of biodegradable container materials. Because disposed of separately, the container closure may be of any suitable material appropriate for the application, while different reusable or biodegradable materials may be used for the container.

16 Claims, 6 Drawing Sheets

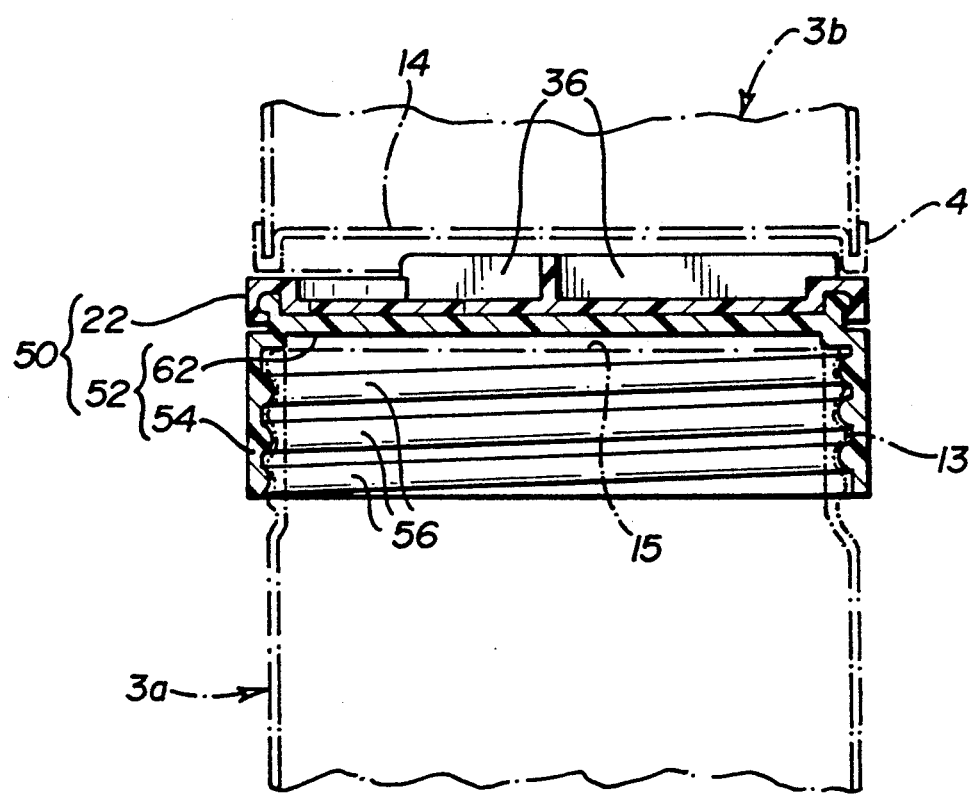

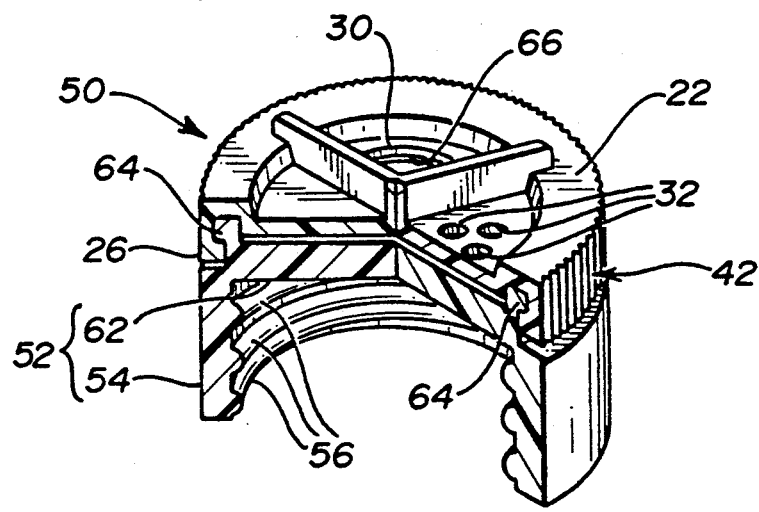
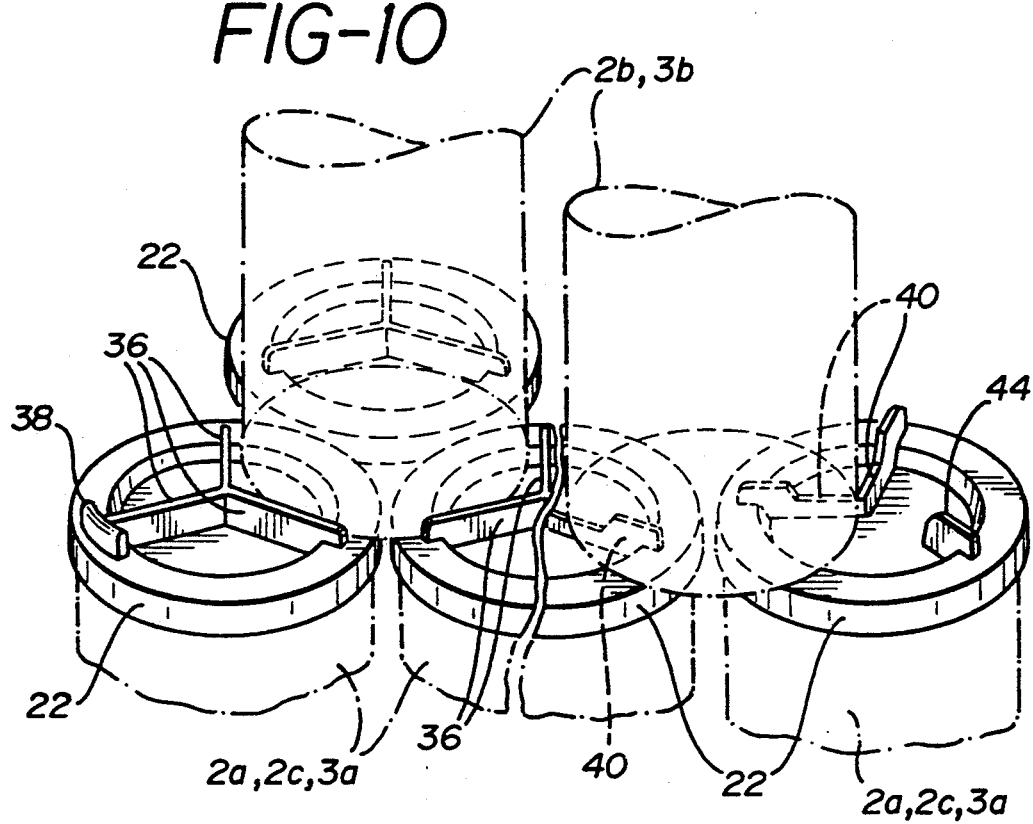

MULTI-FUNCTIONAL, ENVIRONMENTALLY-ORIENTED, TAMPER-EVIDENT CONTAINER CLOSURE

BACKGROUND OF THE INVENTION

The present invention relates to adjustable closures used to dispense particulate and powdered materials from containers, and in particular, to a multi-functional, environmentally-oriented, tamper-evident container closure which may be removably attached to a container end.

Containers are known for particulate and powdered products, such as grated cheese products, seasonings, and non-dairy creamers, which include adjustable plastic closures for dispensing the product by pouring or shaking the container. Such closures have a post-mounted, plastic rotor portion fastened to an assembly or plastic container end. See for example, van Kerkhoven, et al, U.S. Pat. No. 4,969,572; Weidman, U.S. Pat. No. 4,792,054; Kacalieff, U.S. Pat. No. 4,611,725; Davis, U.S. Pat. No. 4,480,864; Otterson, U.S. Pat. No. 4,308,979; Weatherhead, III, U.S. Pat. No. 3,874,580; and LaCroce, U.S. Pat. No. 3,486,665.

The '864 patent to Davis also discloses a punch-out closure comprising a one-piece plastic cap with a punch-out tab, and a post-mounted plastic rotor attached to the cap to cover or expose the opening which is formed by the punch-out tab.

Other features are shown in containers for particulate and powdered products. Plastic lids having a peripheral locking rib attached to a container having a separate container and are shown by Kreiseder et al, U.S. Pat. No. 4,598,837 and Hougen et al, U.S. Pat. No. 3,826,400. In the '837 patent to Kreiseder et al, the plastic lid is also attached to the plastic container end by a post. In the '400 patent to Hougen et al, the plastic lid is removably attached by the peripheral ribs to a metal container end which includes a break-away portion in the form of a pull tab. The plastic lid serves to prevent accidental and premature lifting of the pull tab which would break the seal, and expose the beverage contents to spillage and contamination.

Metal container ends having easy-open push-in portions are also known, and are widely used for dispensing liquids. See for example, Madden et al, U.S. Pat. No. 4,196,823; Debenham et al, U.S. Pat. No. 4,155,480; Gane, U.S. Pat. No. 4,128,186; and Elser, U.S. Pat. No. 4,126,244. However, such push-in metal ends have, heretofore, not been used with plastic lids to produce significant additional function in cooperation therewith.

The use of multi-material containers, and non-biodegradable materials is growing in disfavor as the environmental movement expands, and landfills fill up. Legislation is pending or has obtained passage in a number of states limiting container construction to two biodegradable materials. Such changes promise to impose burdens on manufacturing facilities which currently produce disfavored, multi-material containers. Accordingly, the need exists for improved container designs to meet the needs of consumers for easy access, convenience, and safety, while satisfying the increasing demands for environmentally acceptable disposal.

SUMMARY OF THE INVENTION

The present invention satisfies that need by providing a multi-functional container closure which removably attaches to a container end. So attached, the container closure may be used to control the dispensing of container contents, and when removed, the container closure may be disposed of separately. Because disposed of separately, the container closure may be of any suitable material appropriate for the application, while different, environmentally-oriented materials may be used for the container.

In the first embodiment, the container closure of the present invention is adapted for attachment to an existing container which has a lip and a push-in opening at one end. The container closure includes a closure panel having a peripheral rib which is adapted to removably engage the lip of the container end. The peripheral rib is slidable on the lip to permit rotatably positioning the closure panel on the container end. The closure panel also includes at least one opening for dispensing the contents of the container. A single opening for pouring, or many small openings for shaking may be provided. The closure panel, thus, may be rotated between a position in which the push-in opening is completely blocked, or is partially or substantially aligned with the opening or openings defined in the closure panel. The container closure of the present invention may, thereby, function to dispense container contents in a manner equivalent or superior to existing dispensing features.

The closure panel further preferably includes means for gripping the container closure to enhance positioning the closure panel, means for stacking a second container thereon, and means for reinforcing the closure panel. In accordance with the present invention, a unique fin-like flange structure is provided which may be variously attached and shaped to achieve these various functions separately or in combination.

In the second embodiment, the container closure of the present invention is adapted for use with a container which includes a threaded portion at one end. The container closure of the second embodiment includes two-pieces: a container end cap having threads matable with the threaded portion of the container, and including a push-in opening; and a closure panel of the type described above, which is removably and slidably attached to the container end cap for dispensing.

In the third embodiment, the container closure of the present invention is adapted for attachment to an existing container which only has a lip at one end. The container closure of the third embodiment also includes two-pieces: a container end cap having a peripheral rib which is adapted to removably engage the lip of the container end; and a closure panel of the type described above, which is removably and slidably attached to the container end cap for dispensing.

In addition to being environmentally oriented, the present invention has numerous additional economic advantages and safety features Significantly, the container closures may be used with existing containers, requiring minimal or no costly changes in manufacturing facilities Moreover, the present invention is easily assembled thereto, snapping on or screwing onto existing containers without need for adhesives, center-post attachment, additional seaming, or friction-fit seaming. Preferably made of thermoplastics, the container closure is adaptable to match various container designs and sizes, and can include colors, logos, and printed or embossed indicia. Finally, the addition of the means for stacking improves security of stacked containers for shipping, and enhances stackability of in-store displays, reducing damage and improving sales.

Additional safety features made possible with the container closures of present invention include their combination with containers and container end panels having push-in openings. Push-in openings provide tamper-evident protection of container contents, and maintain the contents in a sealed, fresh condition until the container is opened by the consumer. Provision of a pour opening in the closure panel which is slightly smaller than the push-in opening, permits aligning the pour opening over the push-in opening so that the user contacts the edges of the closure panel, and is protected from contact with sharp edges of the container end during opening of the push-in opening. Overall, the design of the closure panel is environmentally sound, economical, user-friendly, and easy to understand and operate.

Accordingly, it is an object of the present invention to provide a removably attachable container closure which may be used with existing containers to dispense products therefrom.

It is a further object of the present invention to provide a container closure which may be made of any material and which may be used with an environmentally-oriented container, and separated therefrom for disposal after use therewith.

It is a further object of the present invention to provide a container closure which includes means for gripping, means for stacking and/or means for reinforcing.

These and other features and advantages of the present invention will become apparent from the drawings and detailed description which follow.

BRIEF DESCRIPTION OF THE DRAWINGS

FIG. 6 is a cross-sectional view of the container closure of FIG. 4 taken along line 5—5, shown attached to the threaded end of a first container, and nested in the bottom end of a second container.

FIG. 7 is a schematic perspective view of the container closure of FIG. 4, partially cut away in cross-section.

FIG. 10 is a schematic perspective view of the closure panel of the present invention in various configurations for stacking.

DETAILED DESCRIPTION OF THE PREFERRED EMBODIMENT

Figure 1:
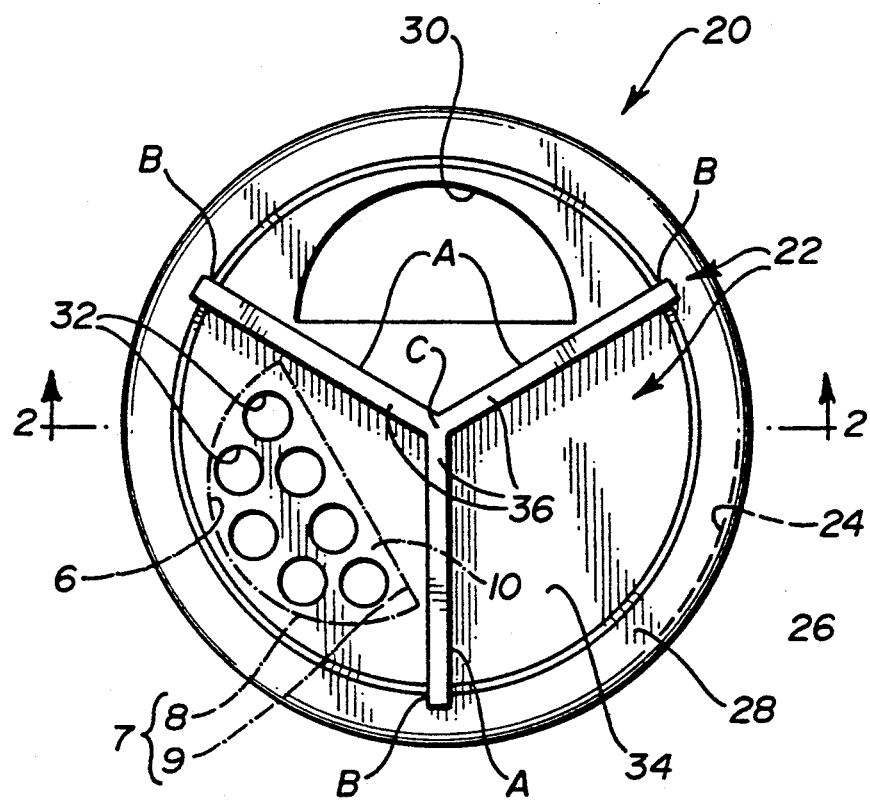
FIG. 1 is a schematic top plan view of the first embodiment of the container closure of the present invention.
Figure 2:
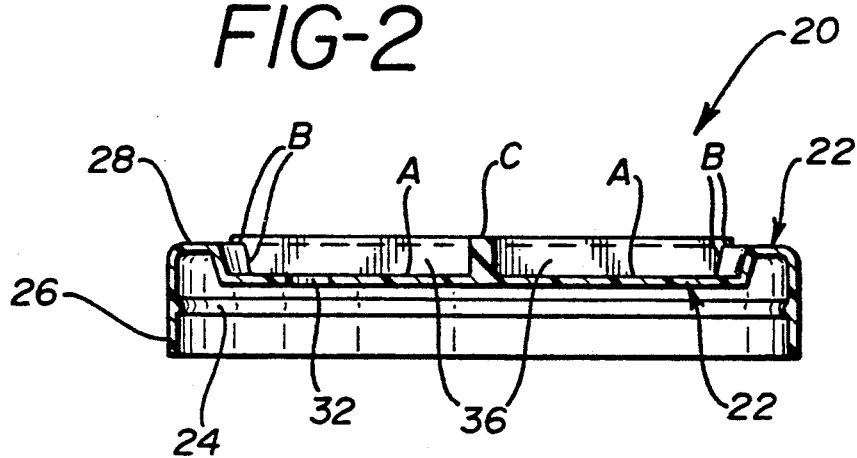
FIG. 2 is a cross-sectional view of the container closure of FIG. 1 taken along line 2—2.
Figure 3A:
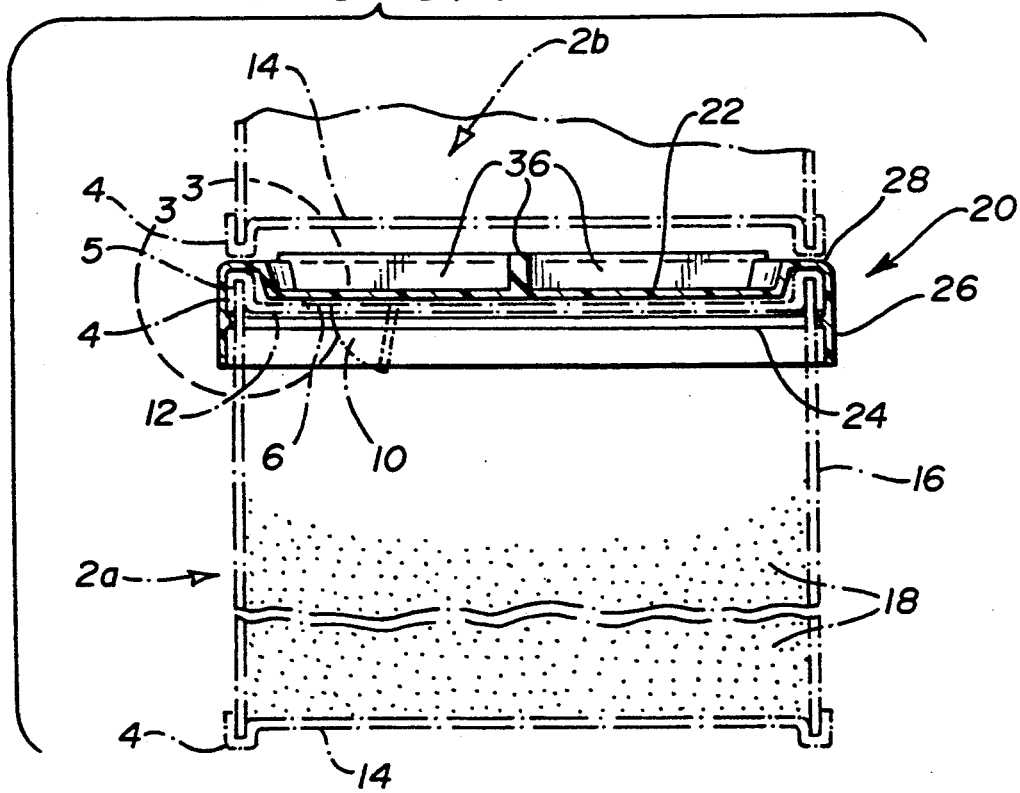
FIG. 3A is a cross-sectional view of the container closure of FIG. 1 taken along line 2—2, shown attached to a first container end, and nested in the bottom end of a second container.
Figure 3B:
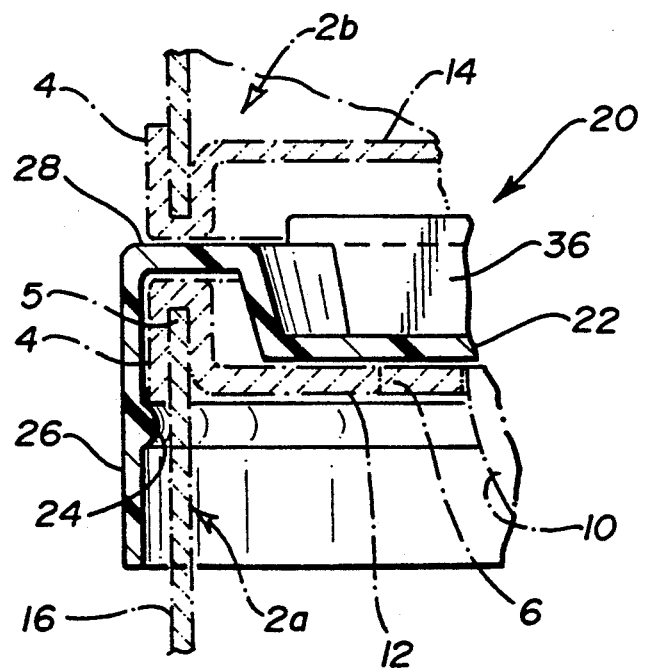
FIG. 3B is an enlarged detail view of the rib of the present invention taken along line 3—3 in FIG. 3A.

Referring to the first embodiment of FIGS. 1–3B, the container closure 20 shown is adapted for attachment to a first existing container 2a, shown in phantom in FIGS. 3A and 3B. Container 2a has an edge 5 and a container end 12 having a lip 4 and a push-in opening 6 The edge 5 may be a seam, edge or other feature formed in the container 2a over which lip 4 fits. Lip 4 is representatively shown as part of first and second container ends 12, 14, where the container ends 12 and 14 are seamed to the container body 16. Container ends 12, 14 are representatively shown as made of metal, and container body 16 is representatively shown as a coated paperboard tube. The container ends 12, 14 and the container body 16, however, may be made of any of various suitable materials, including bio-degradable and recyclable materials, such as glass, tin-plated steel, coated or uncoated, and aluminum, bare or coated Push-in opening 6, also illustrated in phantom in FIG. 1, is a semi-circular shape, but may be any number of shapes which are suitable for dispensing. As shown in FIG. 1, push-in opening 6 is defined by score line 7, which includes a rupturable score line segment 8, and a bendable score line segment 9. Rupturing the rupturable segment 8, and bending along the bendable segment 9 forms a hinged push-in panel 10, which bends inward into the interior of container 2a, as shown in FIG. 3A.

As best shown in FIGS. 1, 2 and 3B, the container closure 20 includes a closure panel 22 having a peripheral rib 24 which is adapted to removably engage the lip 4 of the container end 12. The peripheral rib 24 is slidable on the lip 4 to permit rotatably positioning the closure panel 22 on the first container end 12. The closure panel 22 is preferably made of thermoplastic material and the peripheral rib 24 of the closure panel 22 may be formed in any suitable shape to mate with the lip 4 of a container. The preferred closure panel 22, as shown, includes a peripheral skirt 26 which defines a ridge 28 along the periphery of the closure panel 22 which fits over the container end. The skirt portion of the closure panel 22 carries the peripheral rib 24, and extends along the outer surface of the container 2a. The skirt 26 may be varied in length as required for the particular application.

As shown best in FIG. 1, the closure panel 22 also includes at least one opening for dispensing the contents 18 of the container 2a. A single opening for pouring, pour opening 30, or many small openings 32 for shaking, or as many other types of dispensing openings as space allows, may be provided in closure panel 22 for dispensing the granular or powdered contents 18 of container 2a. The closure panel 22, preferably, also includes an area 34 for blocking the push-in opening 6 to retain and protect the container contents 18, once opened. The closure panel 22 may, thus, be rotated between a position in which the push-in opening 6 is completely blocked by blocking area 34, or partially or substantially aligned with the opening 30 or openings 32 defined in the closure panel 22.

The closure panel 22 also permits additional safety features to be incorporated in the use of the container 2a. The blocking area 34 of the closure panel 22 may also be used to provide an additional tamper-evident feature. Once contents 18 are sealed in the container 2a, and prepared for sale, the closure panel 22 may be positioned to block access to the push-in opening 6, and a consumer-removable, peripheral seal (not shown) may also be applied to secure the container closure 20 in place on the container 2a. The peripheral seal (not shown) must be removed by the consumer, and the closure panel 22 rotated before gaining access to open the push-in opening 6. Damage or premature removal of the peripheral seal may indicate an attempt at tampering. A further safety feature preferred in practicing the present invention, is provision of a pour opening 30 which is slightly smaller than the push-in opening 6 When aligned with the push-in opening 6, the edges of the pour opening 30 will extend beyond, and the closure panel surface will overlay, the edges of the push-in opening 6. See, for example, FIG. 4. This feature protects the user against contact with sharp edges, such as metal edges, of the push-in opening 6 during opening thereof.

The closure panel 22 further preferably includes means for gripping the container closure 20 to enhance repositioning the closure panel 22, means for stacking a second container 2b thereon, and means for reinforcing the closure panel 22. In accordance with the present invention, a unique fin-like flange structure, referred to simply as one or more fins 36, is provided. The fins 36 may be variously attached and shaped to achieve these various functions separately or in combination.

Referring now to FIGS. 1—3 and 10, although it may involve a single fin 36, in its preferred embodiment, the fin structure comprises three fins 36 extending radially from the periphery towards the center of the closure panel 22, and extending upward from the surface of the closure panel 22, thereby serving as means for gripping. See FIGS. 1 and 2. When so used, extension and attachment of the fins 36 to each other at the center at C, as well as to the periphery at B, provides additional strength for grasping the fins 36 to rotate the closure panel 22. The fins 36 are preferably further attached along their lengths, along line A, as shown in FIG. 2, to the surface of the closure panel 22 to provide reinforcement thereof and, thereby, serve as means for reinforcing. Use of the fins 36 as means for reinforcing provides strength to the closure panel 22, and reduces the material thickness required for the same degree of rigidity. As shown in FIGS. 2, 3A and 3B, extension of the fins 36 sufficiently upward from the surface of the closure panel 22 allows contact and nesting within the container end 14 of a second container 2b. As shown in FIGS. 3A and 3B, the fins 36 are shaped, near the periphery and along their length, to lodge or nest within the lip 4 of a second container end 14. Three fins 36 are preferred to provide at least three points of contact with the container end 14 of the second, stacked container 2b, to provide stability and effectively inhibit its lateral motion.

Figure 5:
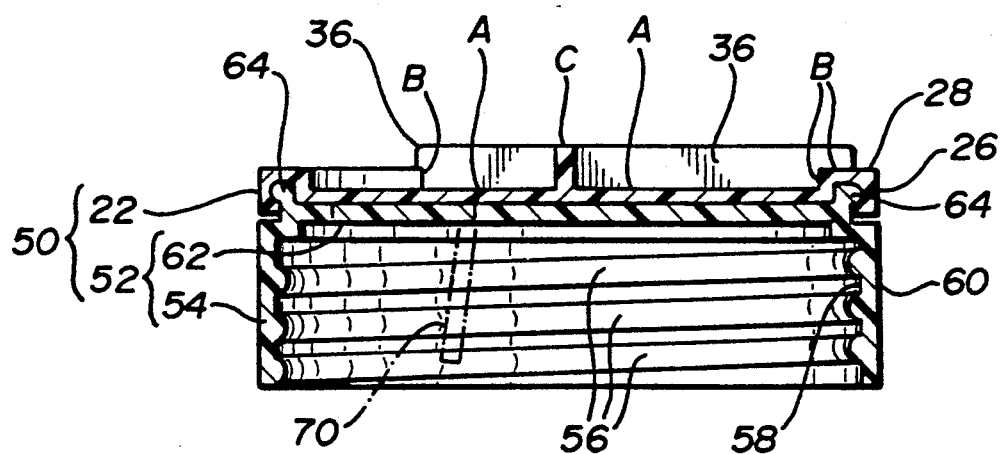
FIG. 5 is a cross-sectional view of the container closure of FIG. 4 taken along line 5—5.

The fins 36 may be of different heights, as illustrated by comparing FIGS. 2 and 5, and may have different shapes as required to nest under a second container end 14. As shown in FIG. 10, the fins 36 may also include a circumferential shoulder segment 38 to improve the fit for nesting. The use of a single shoulder segment 38 makes possible stable nesting with a single fin 36 (not shown) extending across the diameter of the closure panel 22. However, three radial fins 36 are preferred, as shown in FIG. 3A. In addition, as also shown in FIG. 10, the preferred shape and number of the fins 36 permits stable off-set stacking for store displays. In this regard, the fins 36 may also include a depression 40 in the center area, or be truncated fins 44 to permit off-set stacking in a single row, as shown in FIG. 10. However, this latter arrangement is less stable.

Shown in FIG. 7, alternative means for gripping may be provided on the closure panel 22 instead of, or in addition to the fins 36 described above. Alternative means for gripping include a reeded edge 42 along at least a portion of the periphery of the closure panel 22, preferably along skirt 26, whereby a user may grasp and rotate the closure panel 22.

Figure 4:
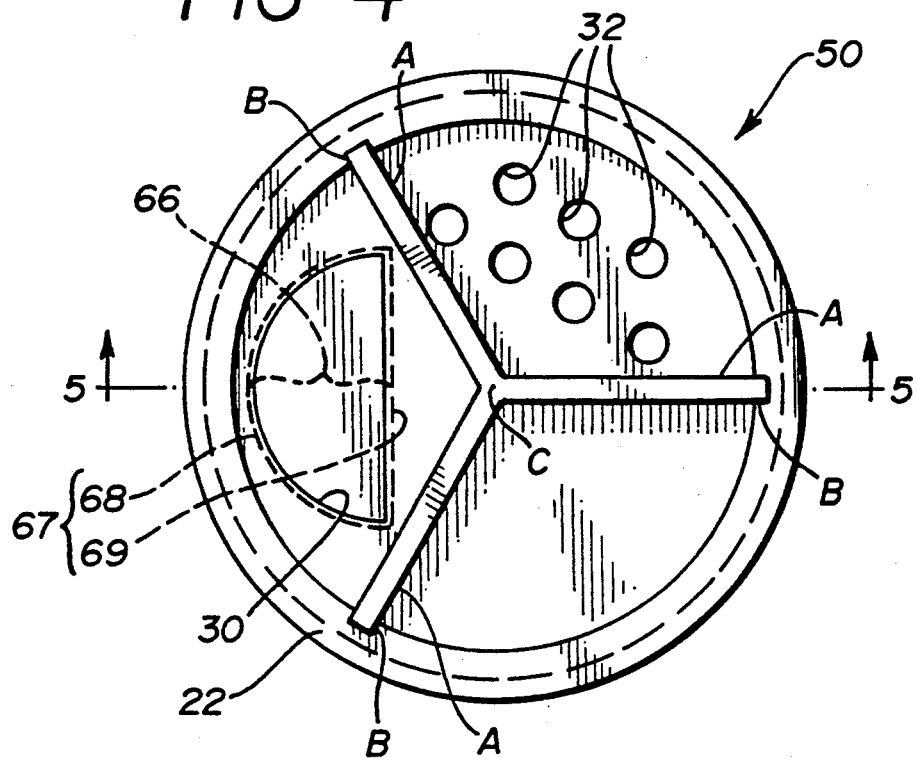
FIG. 4 is a schematic top plan view of the second embodiment of the container closure of the present invention.

The second embodiment of the present invention is shown in FIGS. 4-7 and its use for stacking is also illustrated in FIG. 10, where like numbers represent like elements The second embodiment, container closure 50, is provided for use with a container 3a, shown in FIG. 6, which is open at one end and includes a threaded portion 13 at the first, open end 15. Referring to FIGS. 4, 5 and 7, the second embodiment is a two-piece container closure 50 comprising a container end cap 52 and a closure panel 22, such as the closure panel 22 described above, with a shortened skirt 26 for attachment to container end cap 52. The container end cap 52 has a tube section 54 with threads 56 along a surface thereof which are matable with the threaded portion 13 of the container 3a. The threads 56 may be on the inner or outer surface 58 or 60 of the tube section 54, as required to mate with container 3a, but are preferably on the inner surface 58, as shown. A container end panel 62 is disposed across one end of the tube section 54. Container end panel 62 includes a push-in opening 66 defined by a score line 67 which includes a rupturable score line segment 68, and a bendable score line segment 69. Rupturing rupturable segment 68 and bending along bendable segment 69 forms a hinged, push-in panel 70, shown in phantom in FIG. 5, bent inward. FIG. 7 shows the push-in opening 66 aligned with the pour opening 30 of closure panel 22. A raised lip 64 extending upward, as shown, or alternatively, outward (not shown), extends from the surface of the container end panel 62. The closure panel 22 is as previously described, but with the peripheral rib 24 adapted to be removably and slidably engaged with the raised lip 64.

Referring to FIGS. 4 and 5, the closure panel 22 operates in cooperation with the container end cap 52 in the same manner as described aforesaid in the first embodiment in connection with the container end 12. Pour opening 30, small openings 32 and blocking area 34 are included on closure panel 22. As well, fins 36 are attached to closure panel 22, preferably along lines A and points B, and to each other at point C. Such attachment allows fins 36 to serve as means for gripping, means for stacking, and means for reinforcing. As shown in FIG. 6, fins 36 also serve to nest within the second container end 14 of a second container 3b, in like manner as shown with regard to the first embodiment.

The second embodiment may be used with new and existing containers 3a, 3b, etc., as shown in FIG. 6, which may be made of various materials including, for example, glass; plastic; metals, such as tin-plated steel or aluminum, coated or uncoated; paperboard; environmentally-oriented two-material; and multi-material containers.

Figure 8:
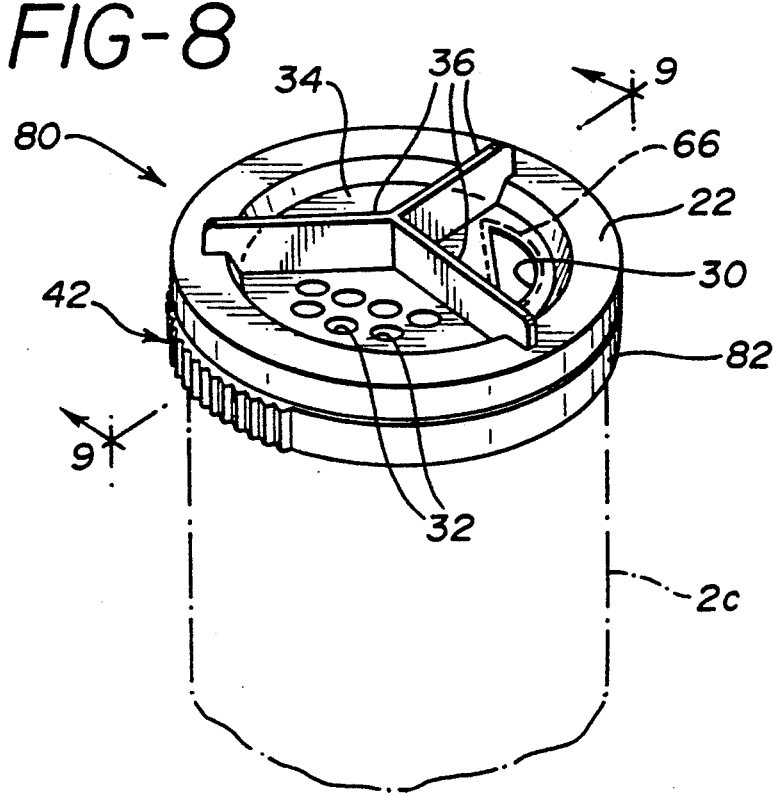
FIG. 8 is a schematic perspective view of the third embodiment of the container closure of the present invention attached to an existing container.
Figure 9:
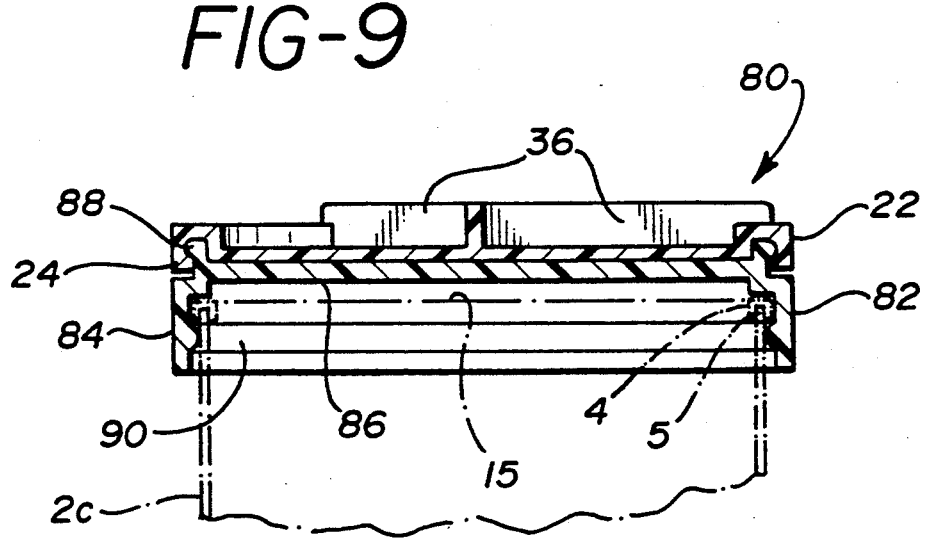
FIG. 9 is a cross-sectional view of the container closure of FIG. 8 taken along line 9—9.

The third embodiment of the present invention is shown in FIGS. 8–9 and its use is also illustrated in FIG. 10, where like numbers represent like elements. In the third embodiment, container closure 80, is provided for use with a container 2c, shown in FIG. 10, which is open at a first end 15 and includes a lip 4 formed over edge 5, as shown, or formed in the container near edge 5 (not shown). Referring to FIGS. 8 and 9, the third embodiment is a two-piece container closure 80 comprising a container end cap 82, and a closure panel 22, such as the closure panel 22 described above. The container end cap 82 includes a short tube section 84 having a peripheral rib 90 which is adapted to removably engage the lip 4 of the first end 15. A container end panel 86 is disposed across one end of the tube section 84 and includes a push-in opening 66, such as provided in accordance with the second embodiment of the present invention. Push-in opening 66 in container end panel 86 may be aligned with the pour opening 30 of closure panel 22. A raised lip 88 extending upward, as shown, or alternatively, outward (not shown), extends from the surface of the container end panel 86, as in the second embodiment. The closure panel 22 is as previously described, but with the peripheral rib 24 adapted to be removably and slidably engaged with the raised lip 88.

Referring to FIGS. 8 and 9, the closure panel 22, as previously described, is preferably configured to include fins 36, a pour opening 30, small openings 32, and a blocking area 34. Closure panel 22 operates in cooperation with the container end cap 82 in like same manner as described aforesaid in the second embodiment with container end cap 52. Preferably, the container end cap 82 snaps over lip 4 and is sufficiently tight to remain fixed on the end of the container without sliding. However, to facilitate user adjustment of the closure panel 22 relative to container end cap 82, it is also preferred to include means for gripping the edges of container end cap 82. Means for gripping includes, for example, a reeded edge 42 or other frictional surface feature along at least a portion of the outer periphery of tube section 84. Alternatively, means for gripping may also be provided along at least a portion of the periphery of the closure panel 22.

As with the second embodiment, the third embodiment of the present invention may be used with new and existing containers 2c, as shown in FIG. 8, which may be made of various materials such as previously described.

The container closures 20, 50, 80 of the present invention are preferably made of linear low density polypropylene, low density polypropylene, polypropylene, or polystyrene. The closure panel 22 may be made in a variety of sizes and shapes. The skirt 26 around the periphery of the closure panel 22 may be made longer or shorter, as may be desired, for example, to position the rib 24 to match a container lip 4, or to match a raised lip 64, 88 or for aesthetic, sealing, or other purposes. The container closures 20, 50, 80 may be produced in colors at minimal additional cost to match customer requirements or for product identification purposes. The blocking area 34 of the closure panel 22 can also be used to emboss or print names, company logos, instructions or other indicia. The capping equipment used for producing and attaching the container closures 20, 50, 80 of the present invention will be similar to that required to produce and attach other types of overcaps and container closures, and major equipment modifications or purchases of additional equipment are not required to employ the present invention.

While certain representative embodiments and details have been shown for purposes of illustrating the invention, it will be apparent to those skilled in the art that various changes in the article disclosed herein may be made without departing from the scope of the invention, which is defined in the appended claims.

What is claimed is:

1. An environmentally oriented, multi-functional, one-piece container closure for an easy-opening container having a container body and a container end, a push-in opening defined by a score line in said container end, and a lip formed in said container end where said container body is inserted in said container end, said lip extending around the outer edge of said container end, said container closure comprising:

a one-piece, removable, rotatable closure panel with a peripheral skirt having a peripheral rib extending around the inner surface of said peripheral skirt and positioned to removably engage only the outermost surfaces of said lip of said container end, said peripheral rib slidably rotatable on said lip to position said closure panel;

said closure panel having at least one opening defined therein, and said closure panel rotatable between a position wherein said closure panel substantially blocks said push-in opening, and one or more positions wherein at least a portion of said at least one opening is generally alignable with at least a portion of said push-in opening; and said closure panel further having means for gripping said closure panel for rotation thereof, said means for gripping extending inward from near the periphery of said closure panel and upward from said closure panel;

whereby said container closure regulates the dispensing of contents from said container.

2. The container closure of claim 1 wherein said at least one opening defined in said closure panel comprises at least a pour opening, said pour opening smaller than said push-in opening and generally alignable thereover to a position wherein the edges of said pour opening extend beyond, and said closure panel substantially overlies, the edges of said push-in opening, whereby said score line may be ruptured by a user to form said push-in opening and contact by the user with the edges of said push-in opening during such rupture may be substantially inhibited by the edges of said pour opening.

3. The container closure of claim 1 wherein said at least one opening comprises a plurality of small openings alignable over said push-in opening.

4. The container closure of claim 1 wherein said means for gripping comprises at least one fin extending generally across a portion of said closure panel, and wherein:

at least a portion of said fin forms the uppermost portion of said closure panel; and said fin is shaped to alternately permit stacking by nesting and off-set stacking of at least one second container.

5. The container closure of claim 4 wherein:

said fin extends upward so that its uppermost portion is nestable within a second container end placed thereover; and said fin includes at least one excised area in said uppermost portion to receive the edge of at least one second container end for off-set stacking such that remaining uppermost portions of said fin are nestable within the said second container end.

6. The container closure of claim 4 wherein:

said means for gripping comprises three fins, and said fins extend upward so that their uppermost portions are nestable within a second container end placed thereover; and said three fins define three sections of said closure panel such that portions of three separate second container ends may be offset stacked, respectively, on said closure panel.

7. The container closure of claim 4 wherein:
said one-piece closure panel further includes an annular shoulder segment inset from the periphery of said closure panel, and extending in a generally circular arc of less than approximately 180°; and
said fin and said annular shoulder segment extend upward such that their uppermost portions are stably nestable within a second container end placed thereover and inhibit said second container end from slidably laterally across said container closure.

8. The container closure of claim 4 wherein said at least one fin is attached to said portion of said closure panel across which it extends to provide reinforcement thereto.

9. The container closure of claim 1 wherein the end of said container body is inserted into a seamed-on container end, and a portion of said peripheral skirt forms a peripheral groove in said closure panel which receives a portion of said seamed-on container end.

10. An environmentally oriented container comprising:
a container body, a container end having a push-in opening defined therein, and a lip formed in said container end where said container body is inserted in said container end, said lip extending around the outer edge of said container end; and
a removable container closure including:
a one-piece, removable, rotatable closure panel with a peripheral skirt having a peripheral rib extending around the inner surface of said peripheral skirt and positioned to removably engage only the outermost surfaces of said lip of said container end, said peripheral rib slidably rotatable on said lip to position said closure panel;
said closure panel having at least one opening defined therein, and said closure panel rotatable between a position wherein said closure panel substantially blocks said push-in opening, and one or more positions wherein at least a portion of said at least one opening is generally alignable with at least a portion of said push-in opening; and
said closure panel further having means for gripping said closure panel for rotation thereof, said means for gripping extending inward from near the periphery of said closure panel and upward from said closure panel;
wherein contents in said container body may be dispensed in a regulated manner with said container closure.

11. The container of claim 10 wherein said closure panel further includes three or more areas including a blocking area, a pouring area, and a shaker area, wherein:
said blocking area is alignable with said push-in opening to substantially block said push-in opening;
said pouring area includes a pour opening defined in said closure panel, said pour opening generally alignable over said push-in opening to permit freely pouring the contents of said container therethrough; and
said shaker area includes one or more small openings defined in said closure panel, said one or more small openings generally alignable over said push-in opening to restrict the dispensing of container contents.

12. The container of claim 10 wherein said means for gripping comprises at least one fin extending generally across a portion of said closure panel, and wherein:
at least a portion of said fin forms the uppermost portion of said closure panel; and
said fin is shaped to alternately permit stacking by nesting and off-set stacking;
whereby a second container may be stacked on top of said container.

13. The container of claim 10 wherein said container end is a seamed-on container end, and a portion of said peripheral skirt forms a peripheral groove in said closure panel which receives a portion of said seamed-on container end.

14. The container of claim 12 wherein:
said fin extends upward so that its uppermost portion is nestable within a second container end placed thereover; and
said fin includes at least one excised area in said uppermost portion to receive the edge of at least one second container end for off-set stacking such that remaining uppermost portions of said fin are nestable within said second container.

15. The container of claim 12 wherein:
said means for gripping comprises three fins, and said fins extend upward so that their uppermost portions are nestable within a second container end placed thereover; and
said three fins define three sections of said closure panel such that portions of three separate second container ends may be offset stacked, respectively, on said closure panel.

16. The container of claim 12 wherein:
said one-piece closure panel further includes an annular shoulder segment inset from the periphery of said closure panel, and extending in a generally circular arc of less than approximately 180°; and
said fin and said annular shoulder segment extend upward such that their uppermost portions are stably nestable within a second container end placed thereover and inhibit said second container end from sliding laterally across said container closure.

* * * * *

UNITED STATES PATENT AND TRADEMARK OFFICE
CERTIFICATE OF CORRECTION

PATENT NO. : 5,213,238
DATED : May 25, 1993
INVENTOR(S) : Martin et al

It is certified that error appears in the above-indentified patent and that said Letters Patent is hereby corrected as shown below:

Col. 9, Line 14  "from slidably laterally" should be --from sliding laterally--.
Col. 9, Line 54  "wherein contents" should be --whereby contents--.

Signed and Sealed this

First Day of February, 1994

Attest:

BRUCE LEHMAN

*Attesting Officer*    *Commissioner of Patents and Trademarks*